United States Patent [19]
Wang

[11] Patent Number: 5,684,452
[45] Date of Patent: Nov. 4, 1997

[54] MULTI-PURPOSES WARNING DEVICE

[76] Inventor: Shiunn-terny Wang, No. 161, Szuteh Rd., Pentang Village, Wufeng Hsiang, Taichung Hsien, Taiwan

[21] Appl. No.: 489,323

[22] Filed: Jun. 12, 1995

[51] Int. Cl.⁶ ................................................ B60Q 7/00
[52] U.S. Cl. ................ 340/321; 340/331; 340/332; 340/908; 340/908.1; 248/188.6; 362/428
[58] Field of Search ................................ 340/321, 331, 340/332, 908, 908.1; 248/171, 188.6; 362/191, 428

[56] References Cited

U.S. PATENT DOCUMENTS

| | | | |
|---|---|---|---|
| 4,922,223 | 5/1990 | Prevot | 340/321 |
| 5,319,365 | 6/1994 | Hillinger | 340/321 |

Primary Examiner—Jeffery Hofsass
Assistant Examiner—Edward Lefkowitz
Attorney, Agent, or Firm—Sixbey, Friedman, Leedom & Ferguson, PC; Stuart J. Friedman

[57] ABSTRACT

A multi-purposes warning device includes a battery container, a tube threadedly engaged to an end of the battery container and a flash bulb disposed in the tube, a bracket pivotally engaged to the tube and a flashlight head pivotally engaged to the bracket, a socket slidably mounted to the battery container and the tube, three feet each has an end pivotally connected to the socket and a stick respectively and pivotally connected between the inner side of each of the feet and an outer periphery of the battery container, such that the three feet can be arranged to be a triangle warning sign and the flash bulb provides a flash light.

1 Claim, 4 Drawing Sheets

MULTI-PURPOSES WARNING DEVICE

BACKGROUND OF THE INVENTION

The present invention relates to a warning device and, more particularly, to a multi-purposes warning device having features of being a flashlight, a warning sign with a reflection outer surface and a flash light sign with a flash bulb disposed therein.

A conventional warning device is a triangle frame on which a reflective material is adhered such that when a car accident happened or a car is out of order, the driver puts the warning device on a position behind of the car at a certain distance for warning the following cars not to drive in this same line to prevent a possible accident. However, the conventional warning device has only one feature and the reflection function may be reduced in a fog area or a dark area and possibly be omitted because of its small occupation.

The present invention intends to provide a multi-purposes warning device which has features of being a flashlight, a warning sign with reflection outer surface and a flash light sign to mitigate and/or obviate the above-mentioned problems.

SUMMARY OF THE INVENTION

The present invention provides a multi-purposes warning device which includes a battery container, a tube threadedly engaged to an end of the battery container and a flash bulb disposed in the tube, a bracket pivotally engaged to the tube and a flashlight head pivotally engaged to the bracket, a socket slidably mounted to the battery container and the tube, three feet each has an end pivotally connected to the socket and a stick respectively and pivotally connected between the inner side of each of the feet and an outer periphery of the battery container, such that the three feet can be arranged to be a triangle warning sign and the flash bulb provides a flash light.

It is an object of the present invention to provide a warning device which has a flash bulb disposed thereto.

It is another object of the present invention to provide a warning device which can be used as a flashlight.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
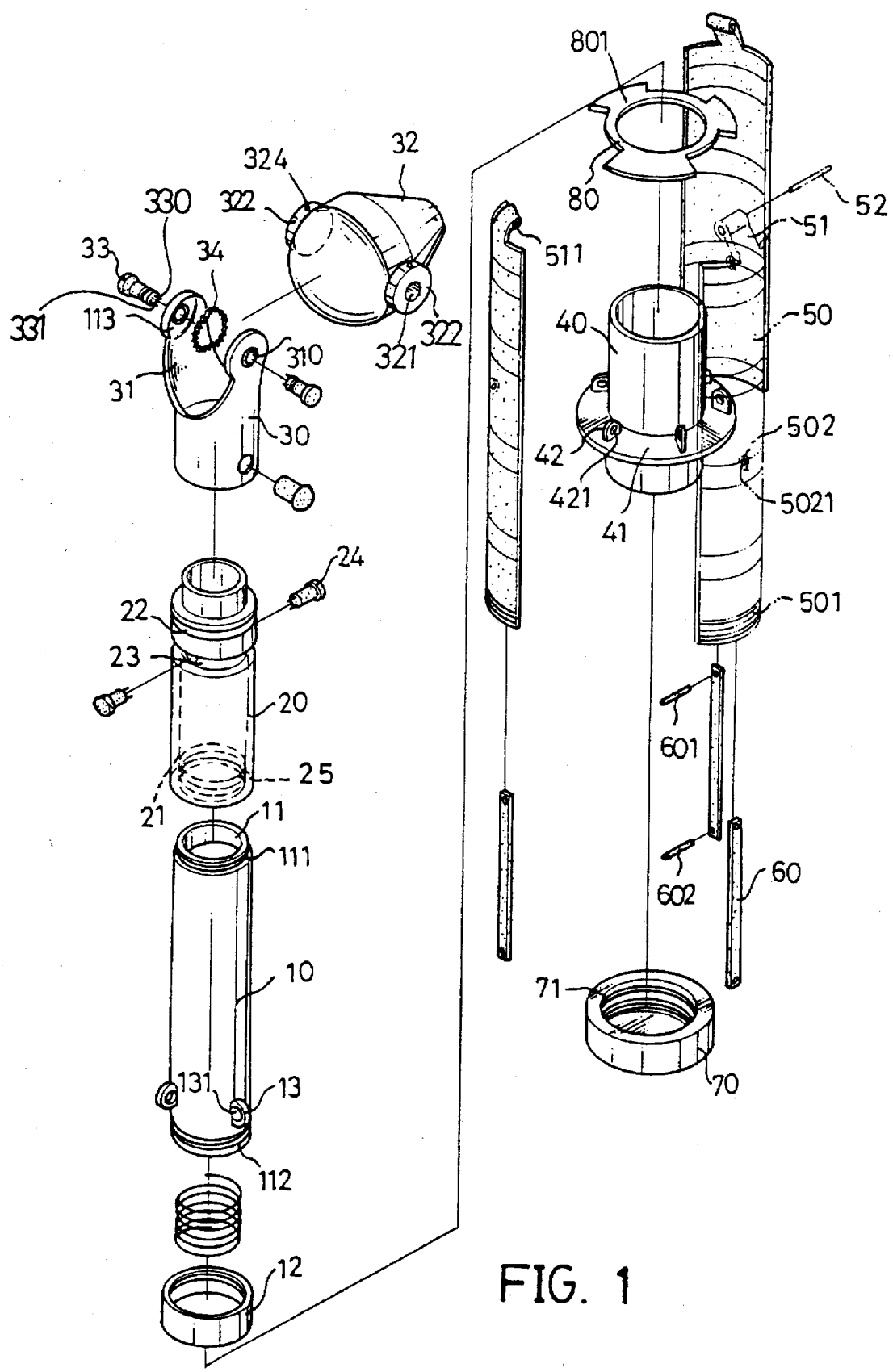
FIG. 1 is an exploded view of a warning device in accordance with the present invention.
Figure 2:
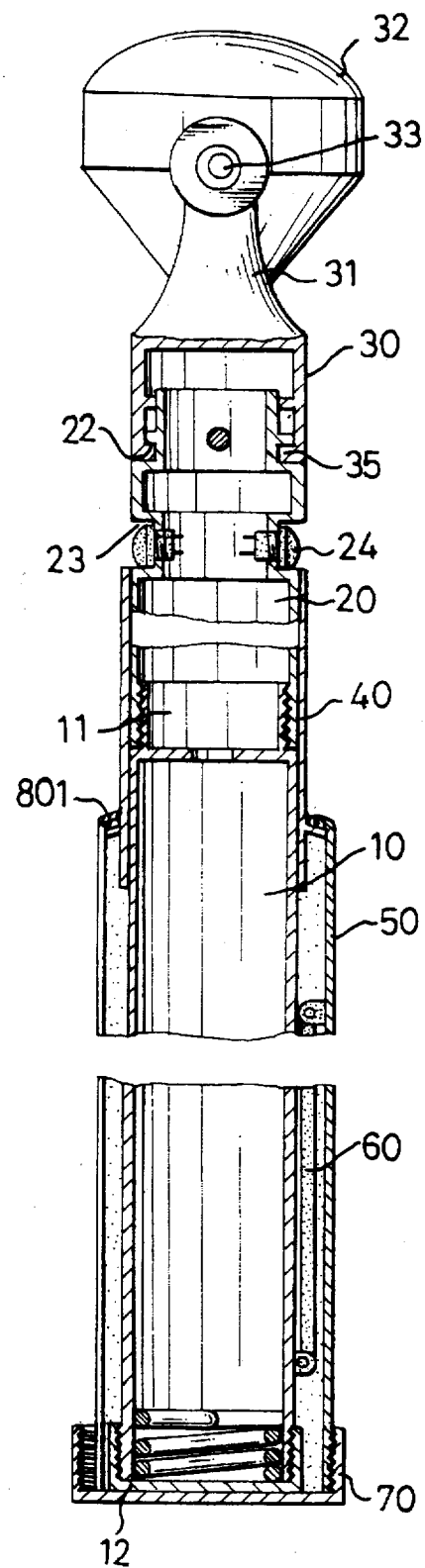
FIG. 2 is a side elevational view, partly in section, of the warning device in accordance with the present invention.
Figure 3:
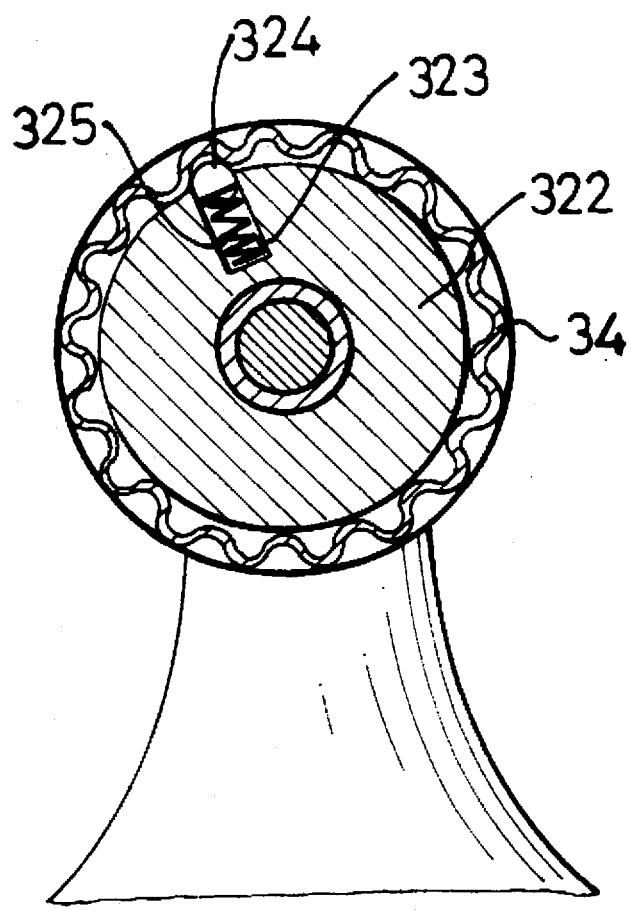
FIG. 3 an illustrative view showing the engagement of the flashlight head and the extension.

Referring to the drawings and initially to FIGS. 1, 2 and 3, a multi-purposes warning device in accordance with the present invention generally includes a battery container 10, a tube 20, a bracket 30, a flashlight head 32, a socket 40, three feet 50 and three sticks 60. The battery container 10 has a first end and a second end, the first end thereof having a circular wall 11 extending therefrom and the circular wall 11 having a first threaded portion 111 defined in an outer periphery thereof, the second end thereof having a second threaded portion 112 defined in an outer periphery thereof for a first cap 12 threadedly engaged thereto, at least three ears 13 extending radially from the outer periphery of the container 10 and each ear 13 having a hole 131 defined therein.

The tube 20 has a first end and a second end, a flash bulb 21 (shown in phantom line) disposed therein, the first end thereof having a first groove 22 and a second groove 23 respectively defined in a periphery thereof, two first buttons 24 diametrically disposed to the tube 20 and received in the second groove 23 for electrically controlling the flash bulb 21, the second end thereof having a threaded portion 25 defined in an inner periphery thereof for threadedly engaged to the first threaded portion 111 of the battery container 10.

The bracket 30 has a first end and a second end, the first end thereof having two extensions 31 extending oppositely therefrom, each extension 31 having a recess 311 defined in a distal end thereof and having a hole 310 defined in a center of the recess 311, the second end thereof has a flange 35 extending inwardly and radially therefrom for engagement with the first groove 22 of the tube 20. The flashlight head 32 is rotatably disposed between the two extensions 31 and has a circular block 322 diametrically extending outwardly from an outer periphery surface thereof for being received in the corresponding recess 311. Each block 322 has an aperture 321 defined in a center thereof and each aperture 321 is in alignment with the corresponding hole 310 of the extension 31 for receiving a second button 33 which extends through the hole 310 of the extension 31 and is engaged with the aperture 321. One of the circular blocks 322 has a concave 323 in which a ball 324 is biased by a spring 325, the ball 324 engaged with a rugged ring 34 which is mounted to the circular block 322 so as to position the rotated flashlight head 32. Each one of the second buttons 33 has two connecting pins 330, 331 for electrically connecting the buttons to the flashlight head 32 and the batteries (not shown) in the battery tank 10.

The socket 40 is sized such that it is slidably mounted to the battery container 10 and the tube 20 and has a circular plate 41 extending radially therefrom. The circular plate 41 has three pairs of first lugs 42 extending upwardly therefrom, each first lug 42 has a hole 421 defined therein.

Three feet 50 each has a first end and a second end and has a reflection outer surface, the first end thereof has a neck 51 which has a passage 511 defined in a distal end thereof for a pin 52 extending through the passage 511 and the holes 421 of the corresponding pair of first lugs 42. The second end of each of the three feet 50 has a threaded portion 501 defined in an outer periphery thereof, each foot 50 having a second lug 502 extending radially from an inner periphery thereof and each second lug 502 having a hole 5021 defined therein for a stick 60 pivotally engaged between the second lug 502 and the ear 13 of the battery container 10. Each pin 601/602 has a hole 6010/6020 defined in both ends thereof for the two pins 601, 602 respectively extending through the hole 5021 of the second lug 502, the hole 6010/6020 and the hole 131 of the ear 13.

A second cap 70 has an inner threaded periphery 71 for threadedly engaged with the threaded portions 501 of the three feet 50 as shown in FIG. 2. A decoration ring element 80 can be slidably mounted to the socket 40 and has three parts 801 extending radially from a periphery thereof such that each pair of the adjacent sides of the adjacent parts 801 can press the both ends of each pin 52 for a good out-looking sake.

Figure 4:
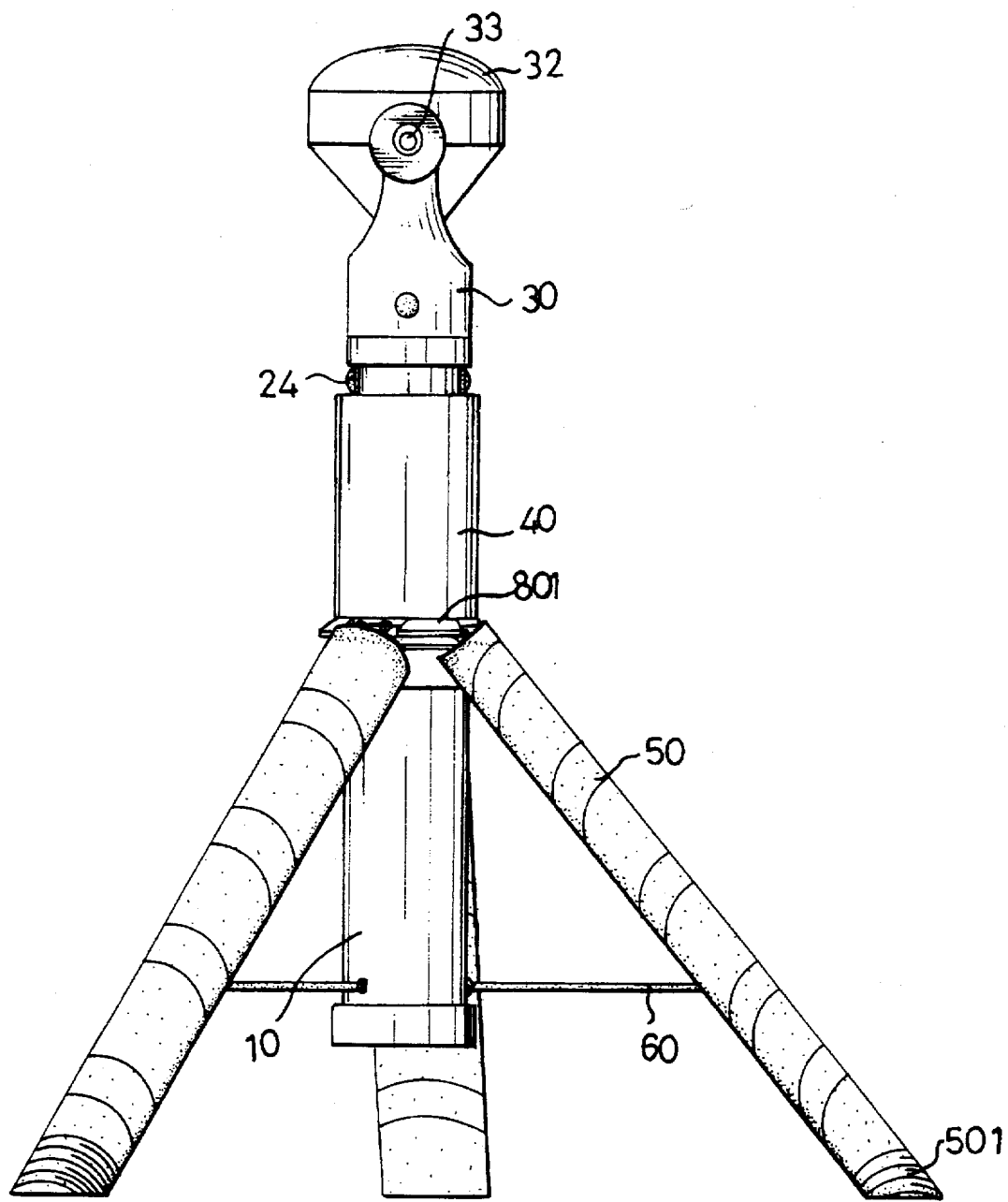
FIG. 4 is a side elevational view of the warning device supported by the three feet.

Accordingly, the warning device can be used as a flashlight (FIG. 2) when the second ends of three feet 50 are arranged to be securely engaged in the second cap 70 and when the second cap 70 is threadedly disengaged from the feet 50, the feet 50 can be opened wide by pulling the second of the feet 50 outwardly as shown in FIG. 4, while the socket 40 is slid downwardly along the battery container 10 and three sticks 60 are pulled to a horizontal position such that the wide-opened feet 50 functioned as a tripod.

Although the invention has been explained in relation to its preferred embodiment, it is to be understood that many other possible modifications and variations can be made without departing from the spirit and scope of the invention as hereinafter claimed.

I claim:

1. A multi-purposes warning device comprising:

a battery container having a first end and a second end, said first end thereof having a circular wall extending therefrom and said circular wall having a first threaded portion defined in an outer periphery thereof, said second end thereof having a second threaded portion defined in an outer periphery thereof for a first cap threadedly engaged thereto, at least three ears extending radially from said outer periphery of said container and each ear having a hole defined therein;

a tube having first end and a second end, a flash bulb disposed therein, said first end thereof having a first groove and a second groove respectively defined in a periphery thereof, said second groove having at least one first button disposed therein for electrically controlling said flash bulb and said second end thereof having a threaded portion defined in an inner periphery thereof;

a bracket having a first end and a second end, said first end thereof having two extensions extending oppositely therefrom, a flashlight head rotatably disposed between said two extensions, each said extension having a hole defined therein, said flashlight head having an aperture diametrically defined in an outer periphery thereof and each said aperture being in alignment with said corresponding hole of said extension for receiving a second button which is electrically connected to said flashlight head and extends through said hole of said extension and engaged with said aperture, said second end thereof having a flange extending inwardly and radially therefrom for engagement with said first groove of said tube;

a socket slidably mounted to said battery container and said tube and having a circular plate extending radially therefrom, said circular plate having at least three first lugs extending upwardly therefrom, each first lug having a hole defined therein;

at least three feet, each having a first end and a second end, said first end thereof having a neck, said neck having a passage defined in a distal end thereof for a pin extending through said passage and said hole of said first lug, said second end thereof having a threaded portion defined in an outer periphery thereof, each said foot having a second lug extending radially from an inner periphery thereof and each said second lug having a hole defined therein for a stick pivotally engaged between said second lug and said ear of said battery container, and a second cap having an inner threaded periphery for threadedly engaged with said threaded portions of said feet.

* * * * *